United States Patent [19]

Flower

[11] Patent Number: 4,641,808
[45] Date of Patent: Feb. 10, 1987

[54] DYNAMIC VIBRATION ATTENUATOR UTILIZING INERTIAL FLUID

[76] Inventor: Wallace C. Flower, 8654 Maplecrest Dr., McKean, Pa. 16426

[21] Appl. No.: 704,448

[22] Filed: Feb. 22, 1985

[51] Int. Cl.⁴ .......................................... F16M 13/00
[52] U.S. Cl. .................................. 248/550; 248/562; 267/140.1
[58] Field of Search ............... 248/550, 562, 566, 638, 248/636, 659; 267/140.1, 35; 188/296, 285, 299

[56] References Cited

U.S. PATENT DOCUMENTS

| | | | |
|---|---|---|---|
| 3,125,186 | 3/1964 | Day | 188/299 |
| 3,399,747 | 9/1968 | Westwell et al. | 188/296 |
| 4,392,639 | 7/1983 | Konishi | 267/140.1 |
| 4,401,298 | 8/1983 | Eaton et al. | 248/562 X |
| 4,418,897 | 12/1983 | Hartel et al. | 248/562 X |
| 4,469,316 | 9/1984 | Vanden Boom et al. | 248/562 X |
| 4,511,126 | 4/1985 | Bernuchon et al. | 248/562 X |

FOREIGN PATENT DOCUMENTS 2041488  9/1980  United Kingdom ............. 267/140.1

Primary Examiner—Ramon S. Britts
Assistant Examiner—Blair M. Johnson

[57] ABSTRACT

The attenuator has a chamber filled with hydraulic fluid and bordered by a diaphragm effective to impart oscillatory movement to a slug of such fluid. During high frequency excitation the inertial forces of the oscillating fluid slug minimize the dynamic stiffness of the attenuating device. The particular excitation frequency at which the foregoing occurs is controlled by an annular tuning plate or assembly disposed in non-engaging relationship to the diaphragm and having an opening which may be adjustable in size either automatically or manually.

15 Claims, 8 Drawing Figures

DYNAMIC VIBRATION ATTENUATOR UTILIZING INERTIAL FLUID

FIELD OF THE INVENTION

This invention relates to dynamic vibration attenuating devices of the type containing hydraulic fluid whose induced oscillation generates inertia forces that at particular excitation frequencies minimize the dynamic stiffness of the device. Although suitable for various uses, such devices are particularly adapted for mounting engine and/or transmission components upon frame components of an automobile or similar vehicle.

BACKGROUND OF THE INVENTION

The engine/transmission mounts of compact and light-weight automobiles, and particularly those having four cylinder engines, may be required to fulfill differing and somewhat conflicting design requirements. To minimize transmission to the frame of vibrations produced by the engine at idling or low speed operation, it may be desirable for such a mounts to possess low stiffness at low frequencies (e.g., 0-30 Hz). On the other hand, it is also usually necessary for prevention of engine "bounce" and the like that the mounts exhibit a high degree of "damping", or more accurately a large loss angle, at the relatively low frequencies of excitations produced by the road surface over which the automobile travels. The mount should also prevent insofar as possible the production within the vehicle interior of so-called "drone" noise. Such noise occurs when excessive mount stiffness results in transmission to the automobile frame of high frequency (e.g., greater than 100 Hz) vibrations caused by second or subsequent order firing disturbances of the engine during operation at speeds of more than about 3,000 RPM. The objectionable drone noise can be avoided by causing the mount to have a very low dynamic stiffness at the particular high frequency excitation resulting from the engine firing disturbances.

While previously proposed fluids mounts alleviate to some extent the problem of excessive mount stiffness at the high frequency excitations causing drone noise, none are readily tunable or adjustable so as to permit precise control over and selection of the particular high excitation frequency or frequencies at which minimum dynamic stiffness is achieved.

SUMMARY OF THE INVENTION

The present invention provides tuning means for permitting control over and selection of the particular high excitation frequency at which there occurs large reduction in the dynamic stiffness of a vibration attenuating device of the hereinbefore described type.

The device of the present invention comprises a housing formed in part of spring-like elastomeric material and having at least one variable volume chamber containing hydraulic fluid. A wall of the chamber includes resilient fluid oscillator means, preferably in the form of a thin resilient diaphragm, that during high frequency excitation of the device imparts oscillatory movement to a slug of the fluid within the chamber. The inertial forces of the oscillating fluid slug reduce the dynamic stiffness of the device at some high frequency excitation. The particular excitation frequency or frequencies at which this occurs is controlled and determined by tuning means disposed in non-engaging spaced relationship to the fluid oscillator means and extending transversely of the path of oscillatory movement of the fluid slug. The tuning means has an opening through which the fluid slug extends. The frequency at which minimum dynamic stiffness of the device occurs is a function of the size of the aforesaid opening, and tuning of the mount may therefore be achieved by appropriate sizing of the opening.

The tuning means may be and preferably is constructed so as to permit manual or automatic adjustment in the size of its aforesaid opening.

DESCRIPTION OF THE DRAWINGS

The foregoing and other features of the invention will be apparent from the following description of illustrative embodiments thereof, which should be read in conjunction with the accompanying drawings, in which.

DESCRIPTION OF THE PREFERRED EMBODIMENTS

Figure 1:
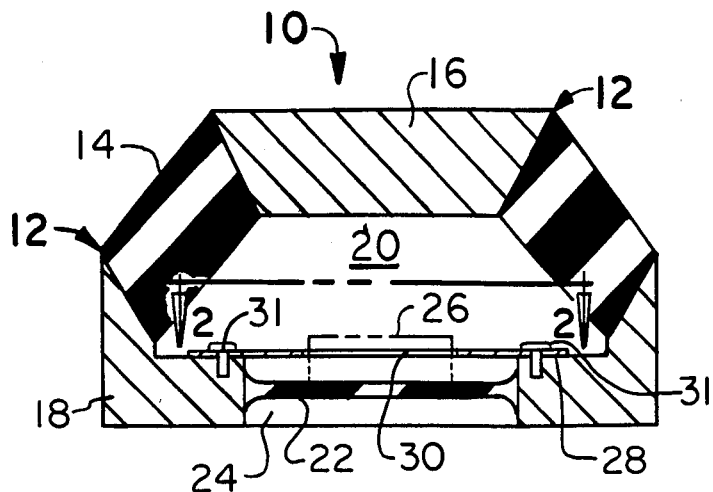
FIG. 1 is a vertical cross-sectional view of a single-chamber vibration isolating device in accordance with the invention.

The vibration attenuating device 10 of FIG. 1 of the drawings is comprised of a housing 12 that includes a spring element 14, made of elastomeric material and of generally conical hollow shape, secured to and between rigid housing members 16, 18 that are adapted for connection to members, such as the engine and frame of an automobile, in association in which device 10 is to be used. An interior variable volume or "working" chamber 20 of housing 12 is filled with hydraulic fluid such as water and/or alcohol or the like. The peripheral walls of chamber 20 are defined by inner surface portions of housing elements 14, 16, 18 and by the inner surface of resilient diaphragm means 22 associated with rigid housing element 18. More specifically in the foregoing regard, diaphragm 22 is bonded or otherwise suitably affixed about its periphery within an opening 24 extending partially or completely (as shown) through element 18. The central portion of the diaphragm 22 is free to flex freely along an axis orthogonal to its major surfaces. In the illustrated orientation of the diaphragm, the flexure axis thereof extends vertically.

In response to alternating increases and decreases in chamber pressure occurring during excitation of device 10 as a result of movement of housing elements 16, 18 toward and away from each other, the central portion of diaphragm 22 undergoes oscillatory flexure and imparts oscillatory movement along its aforesaid flexure axis to a portion or slug 26 of the fluid within chamber 20. As is indicated by phantom lines in FIG. 1, the fluid slug 26 overlies the central portion of diaphragm 22 and extends inwardly (upwardly as viewed in FIG. 1) a considerable distance therefrom. At some high excitation frequencies the inertia forces generated by the oscillating fluid slug 26 will minimize the dynamic stiffness of device 10. The particular excitation frequency at which this occurs is determined and controlled by tuning means to be now described.

Figure 2:
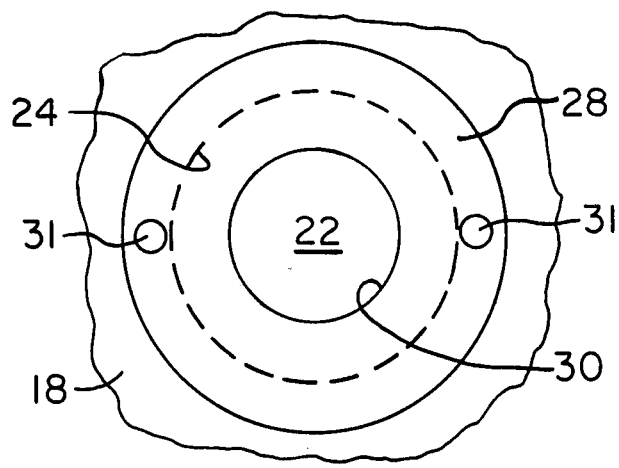
FIG. 2 is a view taken in the direction of the arrows 2—2 of FIG. 1 and showing in top plan the tuning means and adjacent components of the device.

As shown in FIGS. 1 and 2, the tuning means comprises a thin annular tuning plate 28 having a central opening 30. Suitable fasteners 31 mount plate 28 upon the inner surface of housing member 18. The plate extends generally parallel to diaphragm 22, and is centered about the diaphgram's flexure axis. Plate 28 and diaphragm 22 are spaced sufficiently far apart as to prevent engagement between them as the diaphragm flexes, but are sufficiently close together as to insure that the oscillating fluid slug 26 projects through plate opening 30. When its diameter is less than that of the central portion of diaphragm 22, plate opening 30 affects the size of fluid slug 26 and thus the inertial forces generated by its oscillation. By appropriate sizing of plate opening 30, device 10 may be tuned to reach its minimum dynamic stiffness at a particular desired high frequency. Decreasing the size of opening 30 decreases the frequency at which minimum stiffness is achieved, provided that the opening (or openings, if more than one is provided) of the tuning means is not so small as to significantly impede the movement through it of fluid slug 26. Free oscillatory movement of fluid slug 26 is desired, and is enhanced by the large ratio of the diameter of opening 30 to its length, i.e., to the thickness of plate 28. Such ratio is at least ten to one, and usually will be greater.

Figure 5:
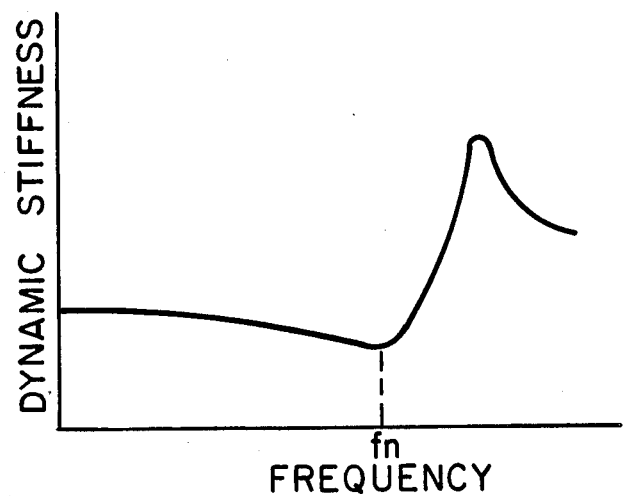
FIG. 5 is a plot of dynamic stiffness against excitation frequency of the device.

In the FIG. 5 plot of the dynamic stiffness of device 10 against excitation frequency, minimum dynamic stiffness is realized at a particular high (i.e., greater than 100 Hz) frequenc $f_n$ dependent upon the size of opening 30 of annular tuning plate 28. The FIG. 5 curve or plot would be shifted to the left by the use of a tuning plate having a smaller opening 30, and to the right by the use of the plate having a larger opening. The dynamic stiffness at frequency $f_N$ may be considerably less than the static stiffness of device 10.

Figure 4:
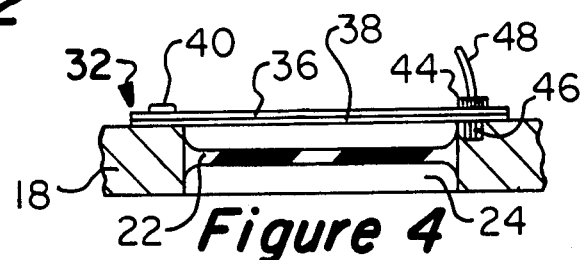
FIG. 4 is an elevational view of the adjustable tuning means and adjacent components shown in FIG. 3.
Figure 3:
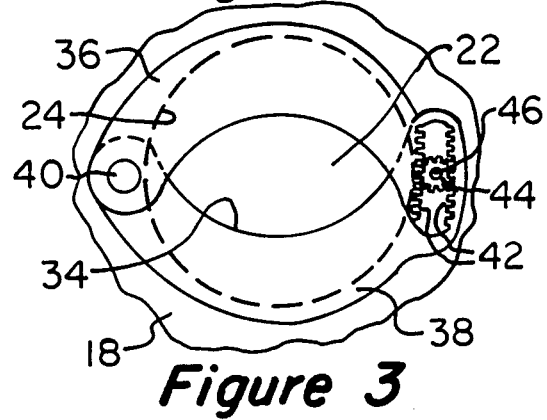
FIG. 3 is a plan view, similar to FIG. 2, of an adjustable embodiment of the tuning means, and of adjacent components, of the device.

In lieu of the tuning plate 28, device 10 might employ an adjustable tuning assembly 32 such as shown in FIGS. 3 and 4. Assembly 32 has an elliptical opening 34, corresponding to the circular plate opening 30 of previously described plate 28, defined between a pair of arcuate plate elements 36, 38 having superimposed opposite end portions. A pin 40 adjacent one end of the assembly 32 mounts the same upon housing element 18 while permitting elements 36, 38 to undergo relative pivotal movement effective to vary the size of assembly opening 34. Adjacent the opposite end of assembly 32, toothed surfaces 42 upon elements 36, 38 mesh with a gear 44 carried by and rotatable with a shaft 46 journaled within a bore of housing member 18. Rotation of shaft 46 and gear 44 in one direction increases the size of opening 34, while rotation in the opposite direction decreases the size of the opening. Shaft 46 is drivable in either direction by a flexible cable 48 connected thereto and extending therefrom to the exterior of device 10 in a manner similar to that illustrated in connection with the device 10' of FIG. 6, to be now described.

Figure 6:
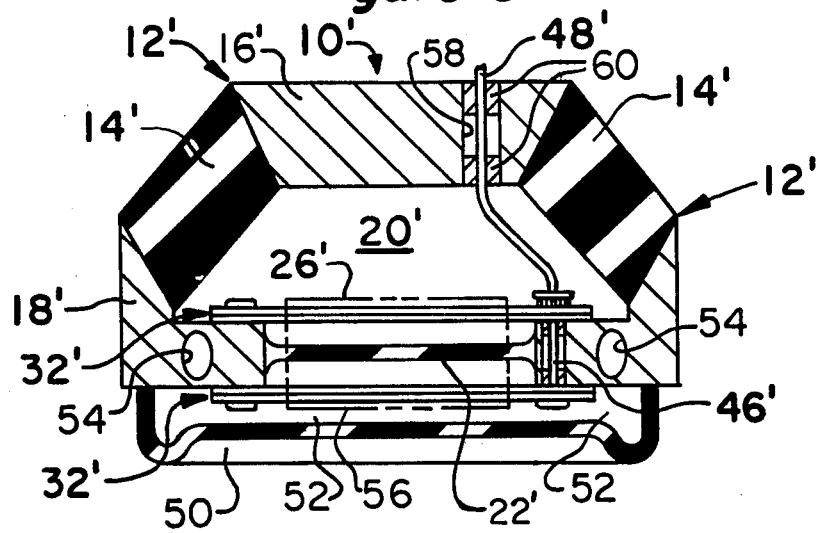
FIG. 6 is a view similar to FIG. 1 of an alternative two-chamber embodiment of the device.

Components of device 10' corresponding or similar to components of previously described device 10 are designated in FIG. 6 by the same reference numerals with the addition of a prime symbol. In addition to housing components 14', 16' and 18', the housing of device 10' includes a flexible bellows that underlies and is fixedly secured to housing element 8' so as to define therewith a second fluid chamber 52. Chamber 52 and the upper or "working" chamber 20' of device 10' are interconnected by an elongate slender passageway 54 provided within housing member 18' and having openings (not shown) at its opposite ends respectively communicating with chambers 20', 54. During low frequency excitation, the stiffness characteristics of device 10' are affected by the fluid within passageway 54. At high excitation frequencies, the oscillatory flexure of diaphragm 22' produces synchronous oscillatory movement of axially aligned fluid slugs 26', 56, the latter being within expansion chamber 52 of device 10'. The tuning means associated with diaphragm 22', for the purpose of governing the high excitation frequency at which minimum dynamic stiffness occurs, may and illustratively does consist of two tuning assemblies 32' respectively mounted upon the upper and lower surfaces of housing member 18' so as to receive, within their central openings, respective ones of the fluid slugs 26', 56. While in some instances it might be desirable for assemblies 32, 32' to be adjustable independently of one another, they may be and illustratively are interconnected by a common shaft 46' so as to undergo simultaneous adjustment upon rotation of the flexible cable 48' connected to it. Cable 48' extends to the exterior of device 10 through a bore 58 directed through housing element 16' and containing suitable bushing and sealing elements 60.

Figure 7:
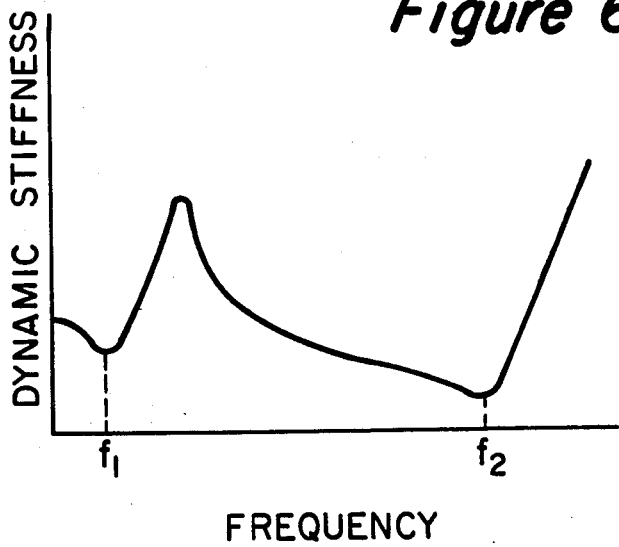
FIG. 7 is a plot of dynamic stiffness against excitation frequency for the device of FIG. 6.

The FIG. 7 dynamic stiffness plot for device 10' illustrates two "notches" or valleys of minimum dynamic stiffness of the mount. The first of these occurs at a low (e.g., under 20 Hz) frequency f1 due to the inertia effect of the fluid within passageway 54 on device 10'. The second occurs at a high frequency f2 as a result of the inertia forces of oscillating fluid slugs 26', 56, and can be varied by adjustment of the tuning means of device 10'.

Figure 8:
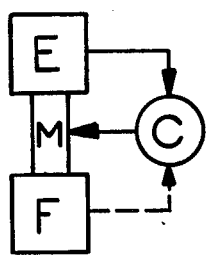
FIG. 8 is a schematic representation of use of the device as an automobile engine mount.

FIG. 8 of the drawings is a schematic representation of an adjustable device M, constructed in accordance with the present invention, mounting the engine E upon the frame F of an automobile or similar vehicle further equipped with a controller C that automatically adjusts or tunes device M in relation to changes in speed of engine E. Alternatively or additionally, controller C might adjust or tune device E in response to input from a sensor that detects frame vibrations capable of causing drone noise within the vehicle.

While embodiments of the invention have been specifically shown and described, this was for purposes of illustration only, and not for purposes of limitation, the scope of the invention being in accordance with the hereinafter presented claims.

I claim:

1. A dynamic vibration attenuating device suitable for use as an engine mount or the like, comprising:
   a housing formed in part of spring-like elastomeric material, said housing having a variable volume working chamber containing hydraulic fluid, said chamber having a wall including resilient fluid oscillator means for during excitation of said device imparting oscillatory movement to a slug of said hydraulic fluid, said oscillatory movement of said fluid slug generating inertial forces effecting a reduction of the dynamic stiffness of said device at high frequency excitation thereof, tuning means disposed within said chamber in non-engaging spaced relationship to said oscillator means and cooperable therewith for causing said stiffness reduction of said mount to occur at a selected excitation frequency of said device, said tuning means including a tuning assembly having at least one opening through which said fluid slug projects, and adjustable means for adjustably varying the size of said opening.

2. A device as in claim 1, wherein said fluid oscillator means comprises a thin diaphragm-like member having a constrained peripheral portion and a flexible central portion.

3. A device as in claim 2, wherein said tuning assembly extends in generally parallel relationship to said diaphragm.

4. A device as in claim 3, wherein said tuning assembly includes first and second members defining said opening therebetween, and means mounting each of said members for adjustive movement relative to the other of said members for varying the size of said opening.

5. A device as in claim 4, and further including means for imparting said adjustive movement to said members of said tuning assembly.

6. A device as in claim 1, wherein said device has a second variable volume chamber also containing hydraulic fluid, and said wall has a long slender passageway interconnecting said working chamber and said second chamber, said oscillator means being effective during operation of said device to impart oscillatory movement to a second fluid slug disposed within said second chamber.

7. A device as in claim 6, wherein said tuning means includes a pair of tuning assemblies each having an opening therein, one of said assemblies being mounted within said working chamber and the other of assemblies being mounted within said second chamber, said assemblies extending in spaced non-engaging and substantially parallel relationship to each other and to said fluid oscillator means, said opening of each of assemblies being adapted to receive the one of said fluid slugs within its respective one of said chambers.

8. A device as in claim 7, and further including control means for adjustably varying the size of said opening of each of said tuning assemblies in response to changes in the operating speed of an engine mounted by said device.

9. A device as in claim 1, wherein said stiffness reduction at said selected frequency is manifested by an abrupt decrease over a relatively small frequency range in the dynamic stiffness of said device.

10. A dynamic vibration attenuating device, comprising: a housing formed in part of spring-like elastomeric material, said housing having a variable volume working chamber containing hydraulic fluid, such chamber having a wall including resilient fluid oscillator means for during excitation of said mount imparting oscillatory movement to a slug of said hydraulic fluid adjacent to said wall, said oscillatory movement of said fluid slug generating inertial forces effecting reduction of the dynamic stiffness of said mount at high frequency excitation thereof, the frequency at which said stiffness reduction occurs being a function of the size of said fluid slug, and adjustable tuning means disposed within said chamber for adjustably regulating the size of said fluid slug.

11. A device as in claim 10, wherein said tuning means includes first and second members moveable relative to each other for effecting adjustment of said tuning means.

12. A device as in claim 10, and further including control means disposed exteriorly of said housing for effecting adjustment of said tuning means.

13. A dynamic vibration attentuating device suitable for use as an engine mount of the like, comprising: a housing having an interior wall and first and second variable volume chambers containing hydraulic fluid and disposed on opposite sides of said wall, said wall having therein elongate slender passageway means for passage of fluid between said chambers, inertial forces generated by movement of fluid within said passageway being effective at a relatively low excitation frequency to reduce the dynamic stiffness of said device, said wall including flexible imperforate diaphragm means for during excitation of said mount imparting oscillatory movement to slugs of said fluid disposed on opposite sides thereof and within said chambers, said oscillatory movement of said fluid slugs generating inertial forces effecting reduction of the dynamic stiffness of said mount at an excitation frequency greater than said first-mentioned excitation frequency, and adjustable tuning means adjacent said diaphragm means for permitting adjustment, by adjustment of the size of at least one of said fluid slgus, of the particular frequency at which said second-mentioned stiffness reduction of said device occurs.

14. A device as in claim 13, wherein said tuning means includes an assembly having first and second relatively moveable members defining an opening therebetween, the size of said opening being adjustable by relative movement between said members.

15. A device as in claim 14, wherein said tuning means further includes control means for imparting said relative movement to said members.

* * * * *